United States Patent Office 3,274,287
Patented Sept. 20, 1966

3,274,287
HYDROCARBON CONVERSION PROCESS
AND CATALYST
Richard N. Moore and James F. Roth, St. Louis, Mo., assignors to Monsanto Company, St. Louis, Mo., a corporation of Delaware
No Drawing. Filed Apr. 21, 1964, Ser. No. 361,552
16 Claims. (Cl. 260—683.3)

The present invention relates to the catalytic conversion of hydrocarbons. Particularly, the present invention relates to a catalyst and process for its use whereby acyclic saturated hydrocarbons are converted by dehydrogenation to mono-ethylenically unsaturated hydrocarbons.

Many catalysts and processes have been proposed for bringing about the dehydrogenation of saturated hydrocarbons to yield unsaturated hydrocarbons. Among the catalysts suggested have been those containing noble metals such as platinum and palladium and a support or carrier such as alumina, silica and combinations thereof. Investigation of these particular prior art catalysts as used in the known processes has revealed many instances of excessive coking or carbon formation and a rapid decline in catalyst activity. Further, and more important, these prior art catalysts have been found to produce undesired side reactions, particularly aromatization, skeletal isomerization and cracking, and to produce undesired quantities of polyunsaturated hydrocarbons such as dienes and trienes. When the desired dehydrogenation product is a mono-ethylenically unsaturated hydrocarbon the side reactions have been found to reduce the efficiency of the processes to such an extent that the processes wherein they occur and the catalysts used therein are not economically practical.

Another disadvantage found in many prior art noble metal containing catalysts which is of considerable economic importance, is the failure to attain maximum utilization of the noble metal components of the catalyst. In many instances, much of the noble metal present in the catalyst is so disposed upon and within the catalyst that it is never utilized. In view of the high cost of the noble metals it is highly desirable to find ways in which maximum utilization of the noble metal components in catalyst compositions may be attained.

It is an object of the present invention to provide a catalyst and process for the conversion of hydrocarbons. Another object of the present invention is to provide a catalyst and process for the dehydrogenation of acyclic saturated hydrocarbons, which catalyst and process significantly minimize undesirable side reactions such as cracking, isomerization and aromatization. It is also an object of the present invention to provide a catalyst and process whereby acyclic saturated hydrocarbons may be dehydrogenated with a minimum of carbon formation and with maintenance of high catalyst activity. Another object of the present invention is to provide a catalyst and process for the dehydrogenation of acyclic saturated hydrocarbons to form mono-ethylenically unsaturated hydrocarbons. A related object is to provide a catalyst and process for the dehydrogenation of acyclic saturated hydrocarbons to form mono-ethylenically unsaturated hydrocarbons while maintaining a minimum conversion to polyethylenically unsaturated hydrocarbons. Another object of the present invention is to provide a noble metal containing catalyst and a process for its use in which maximum utilization of the noble metal components of the catalysts is obtained. Yet another object of the present invention is to provide a catalyst and process for the dehydrogenation of straight-chain paraffin hydrocarbons to form mono-ethylenically unsaturated hydrocarbons with a minimum conversion to aromatics and poly-ethylenically unsaturated hydrocarbons. Additional objects will be apparent from the following description of the invention herein disclosed.

The present invention, which fulfills these and other objects, is a catalyst and process for the dehydrogenation of acyclic saturated hydrocarbons to form mono-ethylenically unsaturated hydrocarbons which comprises contacting said acyclic saturated hydrocarbons in the presence of hydrogen at an elevated temperature, a pressure and contact time sufficient to produce said mono-ethylenically unsaturated hydrocarbons, with a catalyst comprised of 0.02 to 2.0 percent by weight of a noble metal dispersed on a low acidity alumina having a suface area of at least 10 square meters per gram and a macropore volume of at least 0.05 cc./gram, said noble metal being highly dispersed on said low acidity support and distributed on said support so as to produce a local noble metal concentration such that at least 50 percent by weight of the total noble metal present in a catalyst particle is present in a local concentration of no greater than twice that of the total concentration of noble metal in said catalyst particle. The catalyst and process of the present invention result in both an improved conversion of acyclic saturated hydrocarbons to mono-ethylenically unsaturated hydrocarbons and a good yield of mono-ethylenically unsaturated hydrocarbons. Further, undesirable side reactions such as cracking, skeletal isomerization and aromatization, as well as the formation of poly-ethylenically unsaturated hydrocarbons and carbon are substantially reduced by the process of the present invention. Also, longer periods of high dehydrogenation activity are attained through the present catalyst and process.

By "noble metal," as that term is used herein, is meant a metal selected from the group consisting of platinum, palladium, iridium, ruthenium, osmium and rhodium. While all of these metals included within the scope of the term "noble metal," as defined above, are useful in preparing the catalyst compositions of the present invention, the noble metals preferred in practicing the present invention are platinum and palladium. In the particularly preferred manner of practicing the present invention, the noble metal most often used in the catlyst compositions is platinum.

The amount of noble metal present in the catalysts of the present invention may vary from as low as 0.02 percent by weight of the total composition to as high as 2.0 percent by weight of the total composition. Generally, amounts of the noble metals of the present invention in excess of the above limits are avoided because of the relatively high cost of these metals. Noble metal concentrations below those defined above, generally, are impractical to use because of low conversions. Usually, the concentration of noble metal in the catalyst composition of the present invention is within the range of 0.02 to 1.0 percent by weight of the total catalyst. In the preferred practice of the present invention, using the preferred noble metals, the noble metal is present in the catalyst composition in the amount of 0.1 to 1.0 percent by weight of the composition.

To prepare the catalyst composition of the present invention, the noble metal is dispsersed upon a low acidity support material. The acidity of the support useful herein of considerable importance as is illustrated hereinbelow. It has been found that though the carriers of the present invention are usually of low acidity as determined by many of the ordinary known techniques for determining the acid equivalent of such support materials, not all carriers having such low acidity have been found satisfactory in the present invention. Thus, in defining the low acidity characteristics of the carriers of the present invention it has been found necessary to use methods other than those more commonly in general use for determining acidity. To attain this end, the use of a model reaction has been found to provide a satisfactory method of measuring acidity. The use of model reactions to define the limitations of a catalytic material is a well recognized technique and is discussed in Journal of the American Chemical Society, vol. 82, p. 2471 and 2483 (1960). The acidity of the carriers of the present invention is defined herein in terms of an "acidity factor." This acidity factor is determined by placing the carrier or support in a small reaction chamber in contact with a hydrocarbon mixture of 92 percent by weight n-dodecane and 8 percent by weight n-alpha-dodecene and hydrogen in a mole ratio of one part hydrocarbon mixture to two parts of hydrogen. The conditions in the reactor are maintained at a temperature of 435 to 440° C., a pressure of atmospheric pressure, ±2 p.s.i., and a space velocity of the hydrocarbon mixture of 4.65 LHSV. The product of this model reaction is then passed through a gas chromatograph in which the chromatographic column is packed with a substrate suitable for separating the product mixture according to boiling point and polarity, for example, Chromosorb W, which is a flux-calcined diatomaceous earth, treated with Carbowax 20 M plus minor amounts of silver nitrate provides a suitable and preferred substrate. The percent concentration of materials in the product which are eluted from the gas chromatograph prior to n-dodecane represents the acidity factor used herein. The materials eluted from the gas chromatograph ahead of n-dodecane are components lower boiling than n-dodecane and which do not have such polarity as to be held by the absorbent in preference to n-dodecane. In accordance with the present invention, if the concentration of these components eluted before n-dodecane in the product is 10 percent then the acidity factor of the carrier would be expressed as 10. In the practice of the present invention, the carriers or supports for the catalyst are of low acidity, the acidity factor generally being no greater than 2.0. Preferably, the low acidity alumina carriers or supports of the present invention possess an acidity factor of no greater than 1.0. The acidity factor measurement used herein is considered to be critical since those carriers or supports having acidity factors in excess of the above limits do not find practical utility in the catalysts of the present invention without some further preparatory treatments either to the carrier or to the finished catalyst. This treatment may take the form of the incorporation of greater than 0.01% by weight of an alkali or alkaline earth metal in the support of other such methods. Such carriers or supports when incorporated into catalyst compositions produce excessive side reactions, particularly skeletal isomerization, cracking and aromatization as well as the formation of carbon and polyethylenically unsaturated hydrocarbons.

Though the above discussion has suggested measurement of the acidity factor of the non-impregnated alumina support, it is, of course, within the present invention that the acidity factor may be measured on the finished noble metal containing catalyst. The determination of the acidity factor of the finished catalyst is by the use of the above described model reaction. The acidity factor of the finished catayst is usually less than 4.0 and preferably less than 2.5.

In addition to the acidity limitations on the alumina carriers or supports of the present invention, these materials must meet certain other criteria. The carriers useful in the present invention generally possess a surface area of at least 10 square meters per gram. Preferably, these carriers have surface areas of at least 30 square meters per gram. Generally, the carriers of the present invention have a macropore volume of at least 0.05 cc./gram. Preferably, however, the macropore volume of the carriers most useful in the present invention is at least 0.07 cc./gram. Macropore volume as used herein, refers to the total volume of pores within the alumina having a pore radius of greater than 350 angstroms per unit weight of alumina. The macropore volume is expressed herein in terms of cubic centimeters per gram of alumina of pores having a radius greater than 350 angstroms. The use of supports meeting these limitations as to macropore volume and surface area contributes significantly to the maximum utilization of the noble metal of the catalyst composition. Such maximum utilization of the noble metal in many instances reduces to a very significant extent the total amount of noble metal necessary in the catalyst composition. The macropore volume is determined by an Aminco-Winslow mercury porosimeter, model 5-7107 (American Instrument Co.) or equivalent mercury penetration apparatus and represents the internal volume penetrated between 0 to 2500 p.s.i.g. A discussion of macropore volume determination is found in Industrial and Engineering Chemistry, 17, 787 (1945).

The carrier or support for the present catalyst composition comprises an alumina. It is preferred that the alumina be one which has been thermally stabilized. By thermal stability is meant that the alumina should withstand temperatures within the range of 400 to 500° C. for 1 to 12 hours in the presence of oxygen or an oxygen containing gas without any significant reduction in surface area resulting therefrom. If aluminas not previously thermally stabilized are used in the preparation of the catalysts of the present invention, the final calcination of the catalyst, described below, will cause sintering of the catalyst and occlusion of significant amounts of noble metal from active contact with the reactants in the present process resulting in lower catalyst activity.

The method by means of which the catalysts of the present invention are prepared generally involves immersing the alumina catalyst support in a solution comprised of a noble metal salt dissolved in a suitable solvent. Care should be exercised in the catalyst preparation to insure uniform dispersion and distribution of the noble metal upon the catalyst support and to maintain the low acidity characteristics of the support material. Practically any of the noble metal salts may be dissolved in a suitable solvent and used for impregnation of the catalyst support. However, it is generally preferred to use a noble metal salt which either will thermally decompose or may be reduced to yield a noble metal impregnated catalyst support substantially free of acidic ions. For example, halogen containing noble metal salts such as chloroplatinic acid are less desired though they are useful if the catalyst is treated in a manner to remove residual acidity and/or to insure high dispersion. Residual acidity may be removed by such known techniques as steaming, washing with alkaline solutions and the like. With such noble metal salts such as halide containing noble metal salts, the noble metal is often undesirably concentrated on the exterior surface of the carrier or support thus preventing uniform dispersion through both the exterior and interior surfaces of the carrier. The use of competitive absorbates as suggested by R. W. Maatman in Industrial and Engineering Chemistry, vol. 51, p. 913 (1959), provides a method whereby a more desired dispersion of the noble metal may be obtained from the halide containing noble metal salts. Also, if longer periods of immersion of the alumina in the impregnating solution are used, the dispersion of the noble metal on the alumina with halide containing noble metal salts will be improved. Because of this necessary additional treatment or additional immersion time, the halide containing noble metal salts are somewhat less preferred in the preparation of the catalysts of the present invention. The preferred noble metal salts are those such as platinum diaminodinitrite, palladium diaminodinitrite, plantinous tetraminohydroxide, plantinous dihydroxydiamine, palladium dihydroxydiamine, and the like. On reduction of such compounds, the metal is obtained on the catalyst without the presence of residual acidic ions. Such compounds as these may be dissolved in any suitable solvent which preferably does not impart acidity to the catalyst. A particularly useful solvent for such noble metal salts is an aqueous solution ammonium hydroxide.

The noble metal containing catalyst of the present invention is one in which the noble metal is highly and uniformly dispersed on the low acidity alumina support. It has been found that high dispersion of the noble metal on the alumina support is relatively critical to the present invention. A high dispersion of the noble metal on the catalyst support contributes to maximum utilization of the noble metal in the catalyst composition, as well as increasing catalyst activity. Further, catalyst activity is maintained high by the high dispersion of the noble metal components since agglomeration of the noble metal, which is a cause of activity decline, is thereby substantially reduced.

Also of substantial importance in the finished catalyst of the present invention is the distribution of the noble metal within the catalyst particles. The noble metal should be uniformly distributed throughout the alumina. For the purposes of the present invention, uniform distribution is defined in terms of the local concentration of noble metal upon the alumina support. To meet the standards of the present invention, the finished catalyst must have at least 50 percent by weight of the total noble metal present in a catalyst particle present in a local noble metal concentration which is no greater than at least twice that of the total noble metal concentration in the particle. For example, if the total noble metal content of a catalyst particle is 0.1 percent by weight of the particle then at least 0.05 percent by weight of the noble metal of the particle is distributed such that in any given segment or locale of the catalyst particle the concentration of noble metal in said segment or locale is no greater than 0.2 percent by weight of said segment or locale. The local noble metal concentration for any given segment of a catalyst particle may be determined by electron probe microanalysis as described in (1) "The Microscan X-Ray Analyzer Mark II," Cambridge Instrument Co. Ltd., London and Cambridge, England (1961).

(2) Cosslett, V. E., "Proceedings of the X-Ray Colloquim Spectroscopicum Internationale," Spartan Books, Washington, D.C., pp. 357–381 (1963).

(3) Melford, D. A., and Duncomb, P. Metallurgica, 16, No. 367, pp. 205–212 (May 1960).

The uniform distribution of the noble metal within the alumina support contributes materially to increased catalyst activity as well as longer catalyst life.

Methods for obtaining both the high and uniform dispersion and distribution of the noble metal in the finished catalyst are well known to the art. Such prior art methods may, in many instances, produce the high and uniform dispersion and the uniform distribution of the noble metal in the catalyst of the present invention as defined herein. A particularly useful method of preparing such catalyst is that taught herein.

The physical preparation of the catalysts of the present invention most often comprises contacting the catalyst support with a solution of the noble metal salt. The amount of metal salt dissolved in the solvent usually is that amount sufficient to place the desired amount of the metal on the alumina support. Determination of this amount of metal salt is readily within the ability of those skilled in the art. In many instances, it may be desirable to mildly agitate the impregnating solution to aid contact between the impregnating solution and the alumina support. After the alumina has been contacted with the impregnating solution of solvent and noble metal salt until the solution has been absorbed, the impregnated support is then dried in air or other such atmosphere at a temperature of 100 to 300° C. After this drying period, the catalyst is usually calcined in air or other oxygen containing gas at 300 to 600° C. Calcination generally is complete in 1 to 12 hours. The calcined catalyst generally is next subjected to reduction in the presence of hydrogen or other reducing gas in order to obtain the noble metal in a reduced form. Reduction temperatures of 300 to 450° C. are most often utilized. It is within the scope of the present invention that reduction take place in the reaction chamber under reaction conditions since the conditions of the present dehydrogenation process are conducive to reduction.

In order to further describe and to demonstrate the present invention, the following examples are presented. These examples are in no manner to be construed as limiting the present invention.

*Example 1*

A catalyst was prepared by immersing ⅛ inch cylindrical tablets of an alumina support having a surface area of 74 square meters per gram and a macropore volume of 0.12 cc./gram and an acidity factor of 0.1 in a solution of platinum diaminodinitrite salt. The platinum diaminodinitrite solution was prepared by heating an amount of this salt sufficient to obtain a platinum concentration of 0.0030 gram of platinum per ml. of catalyst (bulk volume) in distilled water and adding 10 ml. of concentrated ammonium hydroxide per gram of platinum salt present and, after dissolving the salt, adjusting the volume of the solution by addition of water to an amount sufficient to totally saturate the alumina. After immersion, the impregnated alumina was dried in air at 120° C. for 12 hours. The impregnated alumina was then calcined in air at 500° C. for an addition 12 hours and reduced in pure hydrogen at 450° C. The catalyst so prepared contained approximately 0.3 percent by weight of platinum. The average local platinum concentration was 0.3 percent. The acidity factor of the alumina support was determined by contacting the alumina with a hydrocarbon mixture consisting of 92 percent by weight n-dodecane and 8 percent by weight alpha n-dodecene in the presence of hydrogen in a hydrogen to hydrocarbon mixture mole ratio of 2:1 at a temperature of 435° C. to 440° C., substantially atmospheric pressure (±2 p.s.i.), and a liquid hourly space velocity of the hydrocarbons of 4.65. The products obtained were condensed at 20° C., collected and analyzed by gas chromatography as follows: A ¼ inch diameter chromatographic column 12 feet in length packed with 18 percent of a waxy polyethylene glycol known commercially as Carbowax 20 M, plus 1 percent silver nitrate on a 30–60 mesh flux calcined diatomaceous earth support, known commercially as Chromosorb W, was used with helium as the carrier gas and the chromatograph column temperature programmed from 110° to 230° C. Those components having a retention time less than that of n-dodecane represented 0.1 percent of the product and thus the alumina is said to have an acidity factor of 0.1.

To demonstrate the utility of this catalyst, approximately 29 grams of the catalyst were charged to a reaction chamber approximately 40 inches in length and 0.31 inch in diameter. A $C_{11}$ to $C_{14}$ n-paraffin mixture comprised of 99.2 percent n-paraffin and 0.8 percent aromatic hydrocarbons was then passed into the reaction chamber concurrently with hydrogen in a mole ratio of hydrogen to hydrocarbon of 2:1. The temperature within the reaction chamber was maintained within the range of from approximately 420° C. to 435° C. with the lower temperature being at the start of the run and the higher temperature at the end of the run. A pressure of approximately 4.5 p.s.i.g. was maintained within the reaction chamber. The contact time of the paraffin feed with the catalyst was approximately 2 seconds and the superficial space velocity approximately 0.46 feet per second. After approximately 132 hours, the reaction was terminated and the total product collected and analyzed. This product represented a liquid recovery of 99.2 weight percent. On analysis this liquid product was found to represent a conversion to mono-olefin of approximately 13.2 percent and an average production of 0.096 gram of mono-olefin per gram of catalyst per hour. The analysis of this liquid product was as follows:

| | Percent |
|---|---|
| Paraffin hydrocarbons | 82.0 |
| Mono-olefin hydrocarbons | 13.2 |
| Diolefin hydrocarbons | 1.6 |
| Triolefin hydrocarbons and aromatic hydrocarbons | 3.2 |

Example II

In order to demonstrate the criticality of the particular diluent used in the present process, a run of long duration was carried out with the diluent used being varied throughout the run. The diluents tried were hydrogen, nitrogen and water in the form of steam. In this run the catalyst was the same as that described in Example I with an initial reaction temperature of 420° C., a reaction pressure of substantially atmospheric pressure and a one-second residence time, and with a diluent to hydrocarbon mole ratio of 2:1. The reaction chamber used in this run was 12 inches in length and one inch in diameter. The following table presents the results with particular diluents and the catalyst age in hours when the diluent was used.

DILUTION EFFECTS

| Diluent | Catalyst Age (Hours) | Conversion to Mono-olefin, Percent |
|---|---|---|
| $H_2$ | 52-60 | 7.3 |
| $N_2$ | 60-64 | 1.2 |
| $H_2$ | 64-72 | 7.1 |
| $H_2O$ | 72-82 | 1.5 |
| $H_2$ | 82-102 | 6.6 |

Of particular note is the decrease in percent of mono-olefin conversion when diluents other than hydrogen are used.

To illustrate the effect of the complete lack of diluent in the present process, the above test was continued for several hours, with the exception that the residence time was 1.9 seconds and hydrogen dilution was discontinued for a short period of time. The results of the continuation of this test are given in the following table:

| Diluent | Catalyst Age (Hours) | Conversion to Mono-olefin, Percent |
|---|---|---|
| Hydrogen | 186-194 | 7.5 |
| None | 194-202 | 1.5 |
| Hydrogen | 202-212 | 7.1 |

The criticality of the presence of hydrogen as a diluent in the present process is clearly illustrated by the above experiment. Further, it should be noted that after hydrogen was reintroduced into the reactor at the 202-212 hour catalyst age, the conversion level of 7.5 percent before the deletion of hydrogen was almost completely restored which indicates that hydrogen is apparently more than a mere diluent in the present process.

Example III

A second catalyst was prepared in the same manner as that described in Example I with the exception that the alumina was impregnated with an aqueous solution of chloroplatinic acid. Drying, calcination and reduction were carried out as described in Example I. This catalyst was compared in dehydrogenation activity to the catalyst prepared in Example I by charging 145 ml. of each catalyst into a tubular reactor 1⅜ inches in diameter and 20 inches in length. A feed consisting of purified n-dodecane was introduced into contact with each of the catalysts concurrently with hydrogen at a hydrogen to n-dodecane mole ratio of 2:1. The contact temperature was maintained at 440° C. and the pressure at substantially atmospheric pressure. The product from each of the runs was continuously collected and periodically analyzed during the runs. The conversion to mono-olefin with each catalyst at various catalyst ages is presented in the following table.

| Catalyst | Age (Hours) | Conversion (Percent) |
|---|---|---|
| Catalyst of Example I prepared from platinum diaminodinitrite. | 8 | 12.5 |
| | 12 | 12.1 |
| | 16 | 11.8 |
| | 24 | 11.3 |
| Catalyst of Example II prepared from chloroplatinic acid. | 8 | 10.4 |
| | 12 | 9.7 |
| | 16 | 9.3 |

From the above table it is apparent that the catalyst prepared from platinum diaminodinitrite is somewhat superior to that prepared from chloroplatinic acid. The initial dehydrogenation activity of the catalyst prepared in accordance with the preferred practice of the present invention is significantly greater than that of the catalyst prepared from chloroplatinic acid, and the activity remained higher throughout the run.

Example IV

A number of catalysts were prepared on various alumina supports in order to demonstrate the effect of the acidity factor, macropore volume and surface area of the support on the conversion of acyclic saturated hydrocarbons to acyclic mono-ethylenically unsaturated hydrocarbons. In each instance the catalyst was prepared in the manner described in Example I. All of the catalysts were prepared to contain 0.003 gram platinum per ml. of catalyst. To demonstrate these catalysts, 145 mls. of each catalyst were placed in a cylindrical reactor 20 inches in length and 1⅜ inches in diameter. A mixture of n-dodecane and hydrogen in a mole ratio of n-dodecane to hydrogen of 0.5 was brought into contact with the catalyst at a temperature of approximately 440° C. and at substantially atmospheric pressure. The contact time was 0.3 seconds. The support, its acidity factor, macropore volume, surface area and the results as to conversion and yield of the platinum containing catalyst prepared from each support are presented in the following table.

| Alumina | Acidity Factor | Macropore Volume (cc./gm.) | Surface Area (m.²/gm.) | Total Conversion (Percent) | Mono-olefin Yield (Percent) |
|---|---|---|---|---|---|
| A | 0.2 | 0.227 | 202 | 17.7 | 74.0 |
| B | 0.1 | 0.108 | 83 | 16.3 | 75.4 |
| C | 0.1 | 0.119 | 72 | 16.9 | 74.5 |
| D | 0.5 | 0.054 | 160 | 15.1 | 71.0 |
| E | 0.7 | 0.027 | 268 | 14.7 | 70.1 |
| F | 0.3 | 0.014 | 175 | 13.5 | 65.2 |
| G | 2.9 | 0.107 | 292 | 12.5 | 60.8 |
| H | 6.9 | 0.160 | 438 | 18.5 | 31.9 |

Consideration of the results obtained with the catalysts prepared from aluminas G and H demonstrate the criticality of the acidity factor in the catalyst of the present invention. With alumina G, both conversion and yield are lower than with those catalysts meeting the acidity requirement of the catalysts of the present invention while with alumina H the yields are greatly reduced. The results of the catalysts using aluminas D, E and F illustrate the effect of macropore volume in that both conversion and yields are significantly lower when the macropore volume of the support is below the limitations defined herein. The catalysts prepared from aluminas A, B and C produce significantly better conversions to yields of mono-olefin than those prepared from any of the other aluminas.

*Example V*

Three catalysts, each containing 0.3 percent platinum and supported on an alumina but each having different local platinum concentrations were tested for dehydrogenation efficiency in the same manner and with the same feed as in Example IV. The following table presents the average local platinum concentration and the percent conversion to mono-olefin for each of the three catalysts.

| Catalyst | Local Platinum Concentration | Conversion, Percent |
| --- | --- | --- |
| A | 0.3 | 12.7 |
| B | 0.4 | 11.4 |
| C | 0.9 | 8.0 |

Since the amount of platinum in the catalyst is 0.3 percent by weight, the local platinum concentration may not exceed 0.6 percent according to the definition of uniform distribution as applied to the present invention. Catalysts A and B are within the scope of the present invention while Catalyst C falls outside the scope of the present invention. Comparison of the results obtained with Catalyst C with those obtained with Catalysts A and B demonstrates the criticality of the distribution of the noble metal on the alumina support in the catalysts of the present invention.

The dehydrogenation process of the present invention is generally operated at elevated temperatures. Most often the temperature will be within the range of from approximately 400 to 500° C. At temperatures below this range conversions are so low that reaction becomes impractical while at temperatures above this range excessive side reactions occur. The preferred temperatures for operating the present dehydrogenation process are within the range of from approximately 420 to 480° C.

The pressure at which the present process is operable is somewhat critical to the present invention. Pressures of from subatmospheric pressure up to 100 p.s.i.g. and higher may be used. However, in most instances, pressures substantially atmospheric, i.e. 0 to 10 p.s.i.g., are used. High pressures are less preferred than lower pressures since at higher pressures catalyst conversions are significantly reduced.

Contact time of the acyclic saturated hydrocarbon with the catalyst of the present invention will seldom be above 5.0 seconds nor below 0.05 second. At contact time below this range reaction is incomplete and conversions are low. At contact times above this range there is excessive formation of aromatics, poly-olefinic compounds and cracked products. Preferably, a contact time of 0.1 to 2.0 seconds will be used in the practice of the present invention.

One of the important process limitations of the present invention is found in the use of a diluent with the hydrocarbon feed to be dehydrogenated. The diluent most commonly used is hydrogen. The hydrogen is usually present in a molar ratio to the acylic saturated hydrocarbon feed of from approximately 0.5:1 to 5:1. However, it is preferred that a hydrogen to hydrocarbon mole ratio of 1:1 to 3:1 be used in operating the present invention.

The present catalyst and process find their utility in the dehydrogenation of acyclic hydrocarbons, i.e., branches and straight-chain paraffin hydrocarbons. A particularly effective utilization of the present invention, however, resides in the dehydrogenation of straight-chain paraffin hydrocarbons. The products of the dehydrogenation of straight-chain hydrocarbons have been found quite unexpectedly to provide an alkylate for the preparation of alkyl aromatic sulfonate detergent compositions which are substantially biodegradable. Though the present dehydrogenation process will effect the dehydrogenation of acyclic hydrocarbons of practically any molecular weight, it is most effective in the dehydrogenation of hydrocarbons having 6 to 30 carbon atoms. In its preferred utilization, the present invention produces the dehydrogenation of acyclic hydrocarbons of 8 to 20 carbon atoms per molecule.

The products of the dehydrogenation process of the present invention are mono-ethylenically unsaturated hydrocarbons. The dehydrogenation of substantially straight-chain paraffinic hydrocarbons according to the present invention provides a product particularly useful in the preparation of biologically decomposable detergents. In any event, the products of the present process are unique in that they are of substantially improved purity over those prepared by prior art methods and catalysts. The aromatic and poly-olefin content is substantially lower and there are less skeletal isomers formed by the dehydrogenation reactions.

Superficial space velocities of the reactants within the dehydrogenation reactors used in carrying out the present invention are generally within the range of 0.2 to 15 feet per second. Usually, within this range superficial space velocities toward the higher end or this range are somewhat preferred.

Though the present invention is not limited to the use of a catalyst of any particular shape or size, it is usually preferred to use catalysts of small particle size. Particle shape preferably is such as not to cause significant pressure drop through the dehydrogenation reactor.

The apparatus and arrangement of apparatus for carrying out the present invention is not particularly critical. It is only necessary that good engineering principles be followed in the design and arrangement of this equipment.

What is claimed is:

1. A process for the dehydrogenation of acyclic saturated hydrocarbons to form mono-ethylenically unsaturated hydrocarbons which comprises contacting said acyclic saturated hydrocarbons in the presence of 0.5 to 5 moles of hydrogen per mole of hydrocarbon at an elevated temperature, a pressure and contact time sufficient to produce said mono-ethylenically unsaturated hydrocarbons, with a catalyst comprised of 0.02 to 2.0 percent by weight of a noble metal dispersed on a low acidity alumina support having an acidity factor of no greater than 2.0, said low acidity alumina having a surface area of at least 10 square meters per gram and a macropore volume of at least 0.05 cc./gram, said noble metal being highly dispersed on said low acidity support and distributed on said support sufficiently to produce a local noble metal concentration profile such that at least 50 percent by weight of the total noble metal present in a catalyst particle is present in a local concentration of no greater than twice that of the total concentration of noble metal in said catalyst particle.

2. The process of claim 1 wherein the mole ratio of hydrogen to hydrocarbon is within the range of 1:1 to 3:1.

3. The process of claim 1 wherein the pressure is within the range of from subatmospheric pressure to 100 p.s.i.g.

4. The process of claim 1 wherein the elevated temperature is within the range of from approximately 400 to 500° C.

5. The process of claim 1 wherein the noble metal is selected from the group consisting of platinum and palladium.

6. The process of claim 5 wherein the amount of noble metal present in the catalyst is 0.02 to 1.0 percent by weight of the total composition.

7. The process of claim 1 wherein the acidity factor of the catalyst support is no greater than 1.0 and wherein the low acidity support has a surface area of at least 30 square meters per gram and a macropore volume of at least 0.07 cc./gram.

8. The process of claim 1 wherein the acyclic saturated hydrocarbons have 6 to 30 carbon atoms per molecule.

9. The process of claim 8 wherein the acyclic saturated hydrocarbons are n-paraffin hydrocarbons.

10. The process of claim 1 wherein the noble metal is platinum.

11. The process of claim 1 wherein the contact time is 0.05 to 5.0 seconds.

12. A catalyst composition comprised of 0.02 to 2.0 percent by weight of a noble metal dispersed on a low acidity alumina support having an acidity factor of no greater than 2.0, said low acidity alumina having a surface area of at least 10 square meters per gram and a macropore volume of at least 0.07 cc./gram, said noble metal being highly dispersed on said low acidity support and distributed on said support sufficient to produce a local noble metal concentration profile such that at least 50 percent by weight of the total noble metal present in a catalyst particle is present in a local concentration of no greater than twice that of the total concentration of noble metal in said catalyst particle.

13. The catalyst of claim 12 wherein the noble metal is platinum.

14. The catalyst of claim 12 wherein the noble metal is palladium.

15. The catalyst of claim 12 wherein the amount of noble metal present in the catalyst is 0.02 to 1.0 percent by weight.

16. The catalyst of claim 12 wherein the acidity factor of the catalyst support is no greater than 1.0 and wherein the low acidity support has a surface area of at least 30 square meters per gram.

References Cited by the Examiner
UNITED STATES PATENTS

| | | | |
|---|---|---|---|
| 3,115,531 | 12/1963 | Colton et al. | 260—680 |
| 3,151,180 | 9/1964 | Myers | 260—683.3 |
| 3,168,587 | 2/1965 | Michaels et al. | 260—683.3 |

DELBERT E. GANTZ, *Primary Examiner.*

G. E. SCHMITKONS, *Assistant Examiner.*